United States Patent [19]
Davis et al.

[11] Patent Number: 5,812,221
[45] Date of Patent: Sep. 22, 1998

[54] DIGITAL TELEVISION TRANSMITTER USING SILICON CARBIDE TRANSISTOR AMPLIFIERS

[75] Inventors: Carlton Daniel Davis, Baltimore, Md.; Robert Kent Long, Glenville, Pa.; Jack Jerome Hawkins, Baltimore, Md.

[73] Assignee: Northrop Grumman Corporation, Los Angeles, Calif.

[21] Appl. No.: 795,596

[22] Filed: Feb. 14, 1997

[51] Int. Cl.$^6$ .................................................. H04N 5/38
[52] U.S. Cl. ........................................... 348/723; 348/724
[58] Field of Search ................................. 348/723, 724; 455/39, 91, 109–114, 127; 505/202; H04N 5/15, 5/38, 5/40

[56] References Cited

U.S. PATENT DOCUMENTS

| | | | |
|---|---|---|---|
| 5,291,290 | 3/1994 | Vaughan et al. | 348/723 |
| 5,291,291 | 3/1994 | Eilers | 348/723 |

OTHER PUBLICATIONS

"ATSC Digital Television Standard" Report, *Advanced Television Systems Committee*, Sep., 1995, pp. 46–67.

*Primary Examiner*—Nathan S. Flynn
*Attorney, Agent, or Firm*—Walter G. Sutcliff

[57] ABSTRACT

A UHF transmitter for digital TV signals includes, for example, twelve silicon carbide transistor RF output power amplifier panels driven in parallel by two silicon carbide amplifier driver panels and where each panel is comprised of two modules each further including a 180° signal splitter, a pair of quadraphase signal splitters and combiners, a 180° signal combiner, and five RF amplifier pallets which themselves are comprised of two silicon carbide transistors located on a common flange and operated in push-pull relationship so as to suppress even order distortion products and reduce sensitivity to ground currents. A monitoring system, including a touch screen control display and control panel senses the status of all assemblies so as to allow an operator to control the transmitter and inquire about the status of the various components and power supplies, and to replace one or more units as required without the need for turning the transmitter off.

22 Claims, 13 Drawing Sheets

| | A1 | Q1 | Q2 | Q3 | Q4 | Q5 | Q6 | Q7 | Q8 | Q9 | Q10 |
|---|---|---|---|---|---|---|---|---|---|---|---|
| DRIVER PANEL 1 | | 3.15 | 2.90 | 2.96 | 2.53 | 2.55 | 3.26 | 2.12 | 3.24 | 3.32 | 3.16 |
| DRIVER PANEL 2 | | 2.16 | 2.72 | 3.39 | 3.28 | 2.66 | 3.54 | 3.40 | 2.18 | 3.52 | 2.64 |
| OUTPUT PANEL 1 | | 2.88 | 3.25 | 2.18 | 2.98 | 2.80 | 2.54 | 3.03 | 3.07 | 2.49 | 2.51 |
| OUTPUT PANEL 2 | | 3.34 | 3.33 | 2.98 | 3.57 | 3.46 | 2.44 | 3.14 | 3.57 | 2.46 | 2.90 |
| OUTPUT PANEL 3 | | 2.25 | 3.59 | 3.11 | 2.12 | 2.96 | 2.25 | 2.25 | 3.29 | 2.52 | 2.16 |
| OUTPUT PANEL 4 | | 2.54 | 2.67 | 2.55 | 3.52 | 3.56 | 2.70 | 2.51 | 2.34 | 2.34 | 3.06 |
| OUTPUT PANEL 5 | | 2.71 | 2.71 | 3.16 | 2.58 | 3.04 | 2.41 | 2.37 | 2.97 | 2.22 | 2.78 |
| OUTPUT PANEL 6 | | 3.45 | 2.49 | 3.27 | 2.66 | 2.53 | 3.47 | 3.04 | 3.04 | 2.74 | 2.24 |
| OUTPUT PANEL 7 | | 2.94 | 3.14 | 3.47 | 3.35 | 2.13 | 2.91 | 3.47 | 2.74 | 3.11 | 2.85 |
| OUTPUT PANEL 8 | | 2.87 | 2.79 | 2.63 | 2.70 | 2.50 | 2.18 | 2.46 | 3.56 | 2.19 | 2.68 |
| OUTPUT PANEL 9 | | 2.64 | 2.83 | 2.33 | 2.81 | 2.48 | 3.04 | 2.91 | 2.33 | 3.50 | 3.08 |
| OUTPUT PANEL 10 | | 2.85 | 2.68 | 2.26 | 3.27 | 2.78 | 3.23 | 2.99 | 3.34 | 2.12 | 2.41 |
| OUTPUT PANEL 11 | | 2.21 | 2.25 | 2.59 | 2.29 | 2.10 | 2.90 | 3.08 | 2.91 | 3.34 | 2.22 |
| OUTPUT PANEL 12 | A12 | 2.38 | 3.11 | 2.78 | 2.63 | 2.32 | 3.15 | 3.49 | 2.89 | 2.23 | 3.23 |

CLOSE

FIG.5K 5,812,221

DIGITAL TELEVISION TRANSMITTER USING SILICON CARBIDE TRANSISTOR AMPLIFIERS

BACKGROUND OF THE INVENTION

1. Field of the Invention

This invention relates generally to television broadcast transmitters and more particularly to a UHF digital television transmitter.

2. Description of Related Art

Beginning in 1997 and extending through the year 2112, U.S. television broadcast stations will be converting their conventional analog NTSC modulated TV signals to digital 8 VSB (vestigial sideband) modulated TV signals. The conversions will take place in the present UHF television band. The existing VHF channels will be returned to the FCC for other services. The 8 VSB modulated signal has a higher immunity to amplitude modulated noise and multipath as opposed to the present NTSC system. Additionally, by compressing and randomizing the data, high quality pictures can be transmitted in the same 6 MHz channel. This type of modulation is generally known and is discussed in detail in the ATSC Digital Television Standard Report, dated September, 1995, at pp. 46–67.

An 8 VSB signal, however, differs from the present NTSC signal. For example, the peak to average power ratio of an 8 VSB modulated signal is much higher. The peak to average power ratio is approximately 7 db for an 8 VSB signal. In addition, the flat band-limited white noise-like spectrum of the 8 VSB signal will degrade rapidly if it is passed through a non-linear system. In state of the art power amplifiers, typically silicon power amplifiers, the relatively high peak power drives such amplifiers into saturation and causes distortion accompanied by spectral regrowth. This spectral regrowth decreases the receiving range of the transmitted signal and interferes with adjacent TV channels. Accordingly, broadcast television stations will require a transmitter which can transmit an 8 VSB signal without introducing appreciable signal distortion in the process and thus a linear transmitter with high peak power to average power capability will be necessary. Also, such transmitters should be of such a size so as to not force the station to make major modifications to their facilities.

Presently there are two types of UHF television broadcast transmitters which can transmit 8 VSB digital television signals efficiently. These include the inductive output tube (IOT) transmitter and the silicon solid state transmitter. The IOT is a klystron tube which utilizes a tunable input and output cavity to resonate on the assigned television channel. However, the IOT requires relatively high voltage power supply units and heat exchangers in addition to the RF amplifiers. This ancillary equipment requires a relatively large amount of floor space and decreases system reliability. In addition, the life of an IOT tube is less than 20,000 hours. The solid state silicon transmitter, on the other hand, has more instantaneous bandwidth than the IOT, but silicon solid state transmitters are much larger in size because of the low output power of each transistor. Also, a silicon transmitter is much more expensive than the tube transmitter.

SUMMARY

Accordingly, it is an object of the present invention to provide an improvement in television broadcast transmitters.

It is a further object of the invention to provide a solid state television broadcast transmitter.

It is another object of the invention to provide a solid state UHF digital television broadcast transmitter.

It is still another object of the invention to provide a television broadcast transmitter that can adequately handle the high peak power demanded by 8 VSB modulation and provide a minimum amount of distortion irrespective of the RF output power level.

Still another object of the invention is to provide a television broadcast transmitter which is less than one half the size of existing transmitters for the same output power level.

Still a further object of the invention is to provide a digital television transmitter which is configured to permit a station engineer to maintain and service the transmitter while it is on the air.

Briefly, the foregoing and other objects are achieved by a UHF transmitter which uses silicon carbide transistors. In its preferred embodiment, the transmitter is comprised of twelve silicon carbide transistor RF power panels driven in parallel by two silicon carbide driver panels and where each panel is comprised of two modules, each module contains a pair of quadraphase signal splitters and combiners, and five RF pallets which themselves are comprised of two silicon carbide transistors located on a common flange and operated in push-pull relationship so as to suppress even order distortion products and reduce sensitivity to ground currents. Any of the panels can be replaced while the transmitter is in operation. A monitoring system, including a touch screen control display and control panel senses the status of all of the silicon carbide transistors and assemblies so as to allow an operator to control the transmitter and inquire about the status of the various components and power supplies, and to replace one or more units as needed without the need for turning the transmitter off.

Further scope of applicability of the present invention will become apparent from the following detailed description. However, it should be understood that the detailed description and specific examples, while indicating preferred embodiments of the invention, are provided by way of illustration only, inasmuch as various changes and modifications coming within the spirit and scope of the invention will become apparent to those skilled in the art from the detailed description.

BRIEF DESCRIPTION OF THE DRAWINGS

The present invention will be more fully understood when considered together with the accompanying drawings which are provided by way of illustration only and thus are not limitative of the invention, and wherein:

FIGS. 5A–5K are illustrative of various touch-screen control displays generated on the monitor shown in FIG. 1.

DETAILED DESCRIPTION OF THE INVENTION

Figure 1:
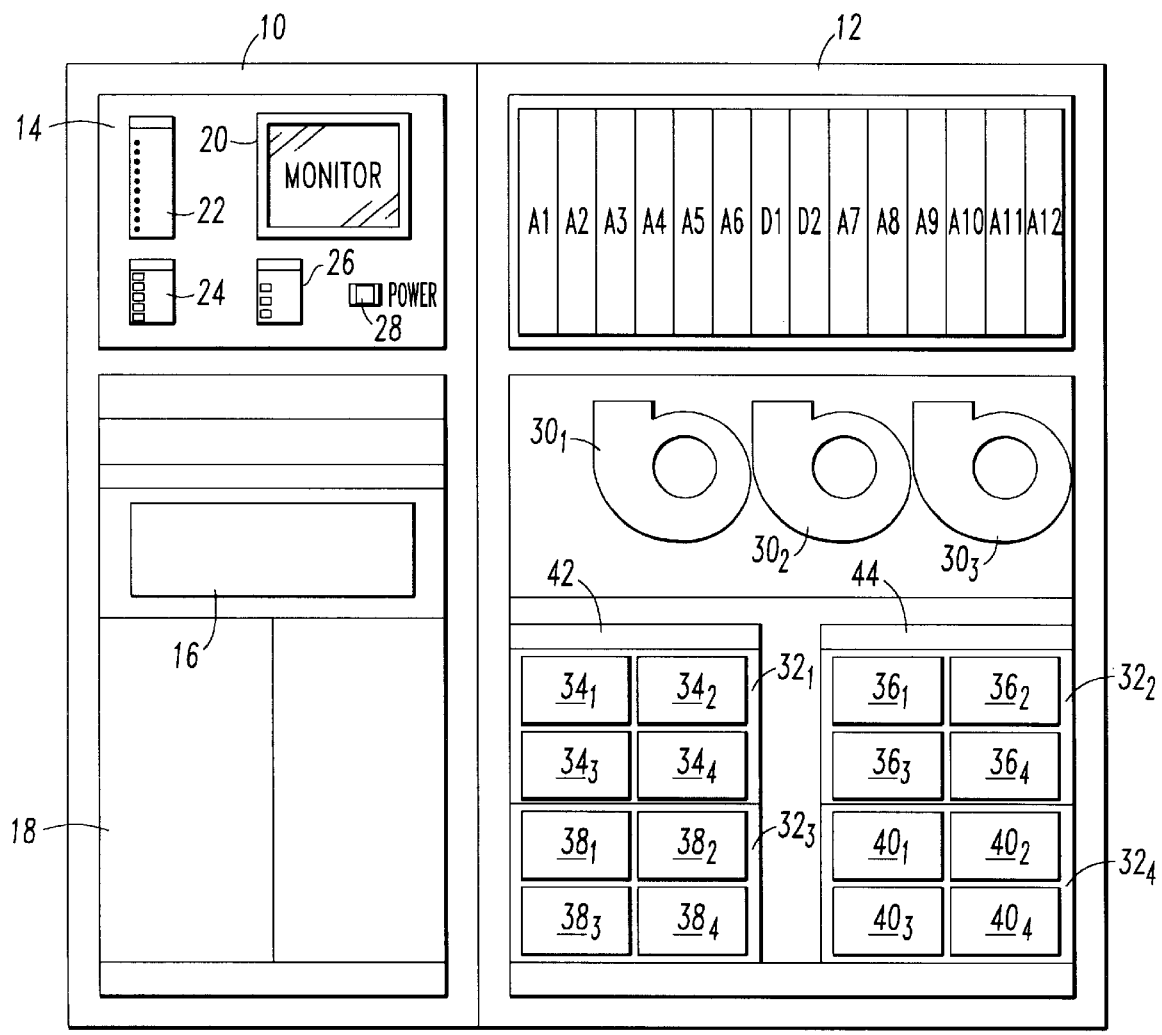
FIG. 1 is a front elevational view generally illustrative of the relative positions of assemblies arranged in two side-by-side cabinets.

Referring now to the drawings and more particularly to FIG. 1, shown thereat are two equipment cabinets 10 and 12.

Figure 2:
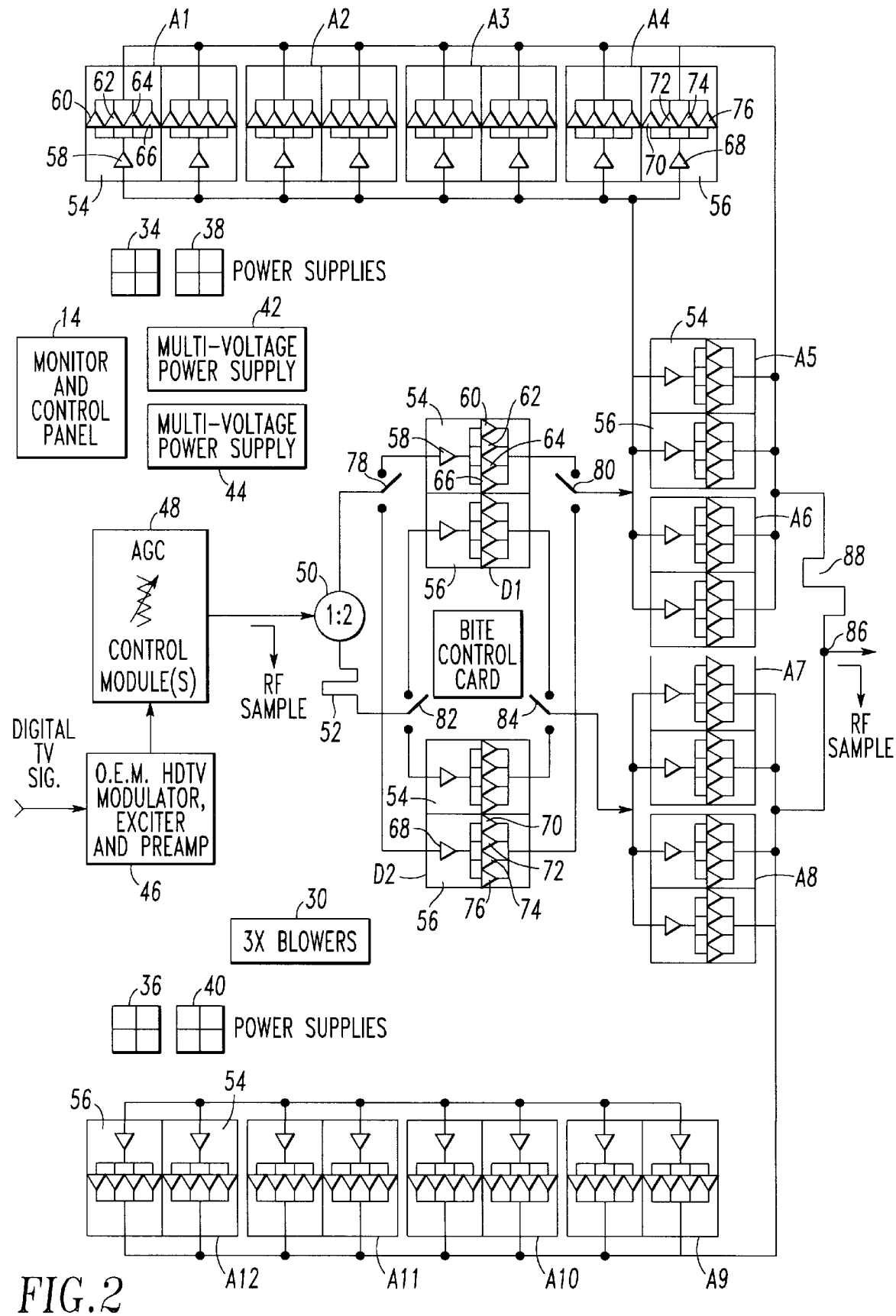
FIG. 2 is an electrical block diagram illustrative of the preferred embodiment of the modular type units included in the subject invention.

Cabinet 10 comprises a control cabinet and has for its purpose housing a control and display panel 14, a space 16 for housing a high definition television (HDTV) modulator and exciter shown in FIG. 2, and a space 18 for housing a plurality of redundant preamplifiers and an automatic gain unit (AGC). This equipment comprises original equipment manufacturer (OEM) type apparatus and is responsive to a digital TV signal data transport located in a studio, not shown. The control and display panel 14 includes a touch-screen control monitor 20 in addition to a set of manually operable control switches and lights 22, 24, 26 and 28, one of which, switch 28, comprises a primary on-off power switch 28.

The cabinet 12 is used to support and house fourteen identical high power silicon carbide transistor panels consisting of two driver panels D1 and D2 and twelve output amplifier panels A1, A2 . . . A11, A12, and which are further shown in FIGS. 2, 3 and 4, and which will be subsequently described. Below the panels are located a plurality, typically three identical blower assemblies $30_1$, $30_2$ and $30_3$ which operate to supply coolant air to the underside of the panels D1, D2, A1, . . . A12. The area below the blowers $30_1$, $30_2$ and $30_3$ comprises the location where a plurality of separately replaceable power supplies are located. As shown, four racks $32_1$, $32_2$, $32_3$ and $32_4$ each containing four 60 V drain bias voltage ($V_{dd}$) power supplies $34_1$ . . . $34_4$, $36_1$ . . . $36_4$, $38_1$ . . . $38_4$ and $40_1$ . . . $40_4$. Above the power supply racks $32_1$ and $32_2$ are two multi-volt supply racks 42 and 44, which generate a gate bias voltage ($-V_{gg}$) as well as a +5 VDC, +15 VDC and −15 VDC supply voltages.

The twelve RF power amplifier panels A1, A2 . . . A11, A12, are combined to typically provide at least 4 kilowatts (KW) of average power and at least 20 KW of peak power. Such a combination is shown in FIG. 2. Typical television broadcast stations, however, will require between 4 to 16 KW of average output power. Accordingly two to four HPA cabinets 12, such as shown in FIG. 1, can further be combined to provide the 4 to 16 KW of RF output power. High power, low loss combiners, not shown, are located in the rear of the HPA cabinet 12. The combiner construction allows any of the RF driver and amplifier panels $A_1$ . . . $A_{12}$ and D1, D2 to be removed and reinserted while the transmitter is operating.

The driver and output amplifier circuitry include the use of silicon carbide transistors which, due to their high output power capabilities, require less transistors for a given output power level than a silicon transistor assembly. This being the case, complex cooling hardware is not required because the transistors can operate at relatively higher temperatures. Accordingly, since the television transmitter in accordance with this invention will require less hardware than its silicon counterpart, its size can be less than one half the size of a silicon transmitter of comparable output power.

Referring now to FIG. 2, shown thereat is an electrical block diagram depicting the preferred embodiment of the subject invention and which includes, as shown in FIG. 1, two driver panels D1, D2 and twelve high power output amplifier panels A1 . . . A12. As shown, a television signal in the form of a digital data stream to be transmitted is first fed into an input section consisting of a high definition television (HDTV) modulator, exciter and preamp unit 46. This equipment comprises conventional state of the art apparatus which can be obtained from any number of sources. The signal outputted from the input section is fed through an automatic gain control (AGC) unit 48, also of well known construction. From there, the digital TV signal is fed to a two way power splitter 50, where one half of the input power is fed to one half of either driver panel D1 or D2, while the other half is fed to the other half of either driver panel D1 or D2 through a 90° phase shifter 52.

It is to be noted that each of the fourteen panels D1, D2, and A1, A2, . . . A12 are of identical construction, and are comprised of two identical modules 54 and 56, which are shown in greater detail in FIG. 3. As shown, module 54 is comprised of an amplifier driver 58 and four power output amplifiers 60, 62, 64 and 66 and are referred to as pallets. In a like manner, module 56 is comprised of a driver pallet 68 and four power output amplifier pallets 70, 72, 74 and 76. This arrangement is repeated throughout the system, with a driver D1 or D2 being used in connection with amplifier panels A1 . . . A12. Further as shown, panels A1 . . . A6 are connected in one parallel output amplifier set, while amplifier panels A7 . . . A12 are connected in a second parallel output amplifier set.

It is to be noted that only one driver panel D1 or D2 is utilized at any one time. This provides an element of redundancy. As shown in FIG. 2, double pole two-position switches 78 and 82 are respectively located on the input side of the drivers, while a like pair of double pole two-position switches 82 and 84 are located on the output side of drivers. The switch positions couple one half of a digital TV input signal to be transmitted through modules 54 and 56 of the same driver panels D1 or D2.

The outputs of the power amplifier panels A1 . . . A12, are combined at a power combining node 86, with the output from panels A1 . . . A6 being first being shifted by 90° by a phase shifter 88. The quadrature two phase shifters 52 and 88 result in quadrature splitting and combining in order to minimize the generation of third order intermodulation sum products while providing two mutually in phase signals at node 86. Less filtering is required when such products are suppressed. Additionally, quadraphase combining reduces amplifier sensitivity to VSWR variations. The power appearing at node 86 is then fed to an antenna, not shown, or further combined with one or more power configurations as shown in FIG. 2, as noted above, for providing, for example, 4 to 16 KW of RF output power.

Figure 3:
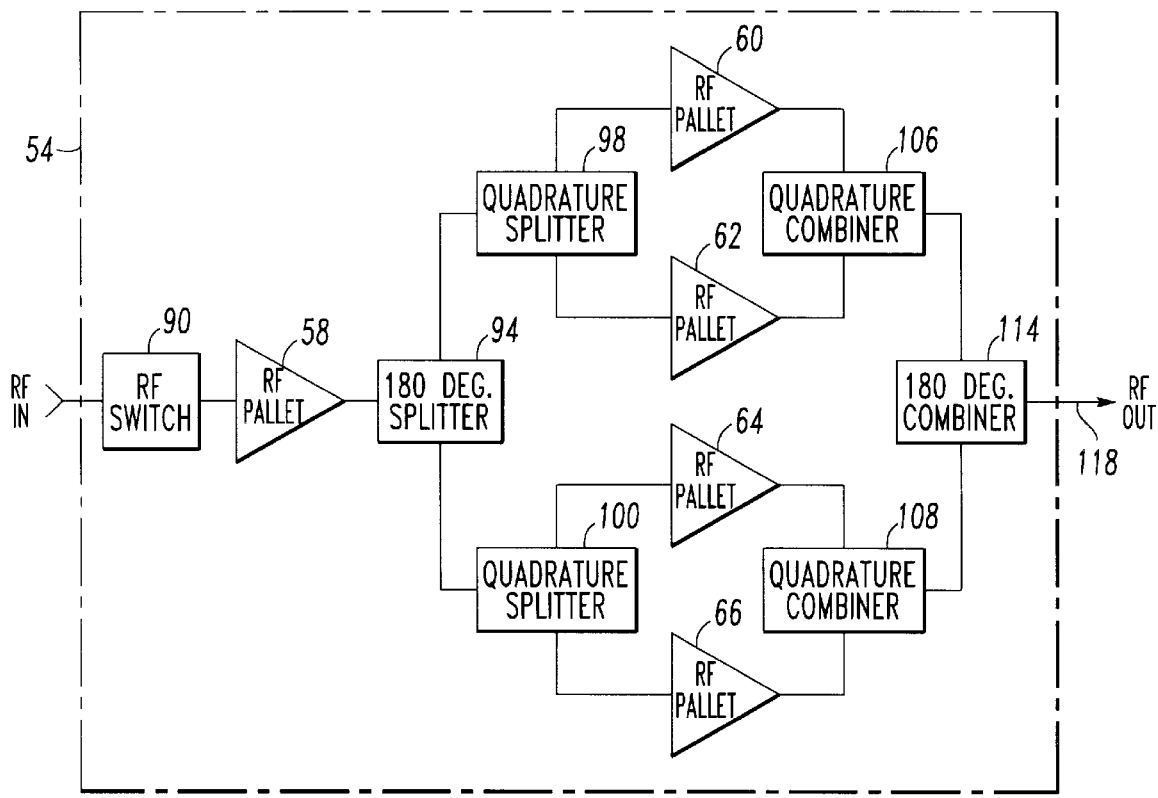
FIG. 3 is an electrical block diagram illustrative of each power amplifier panel component shown in FIG. 2.
Figure 3:
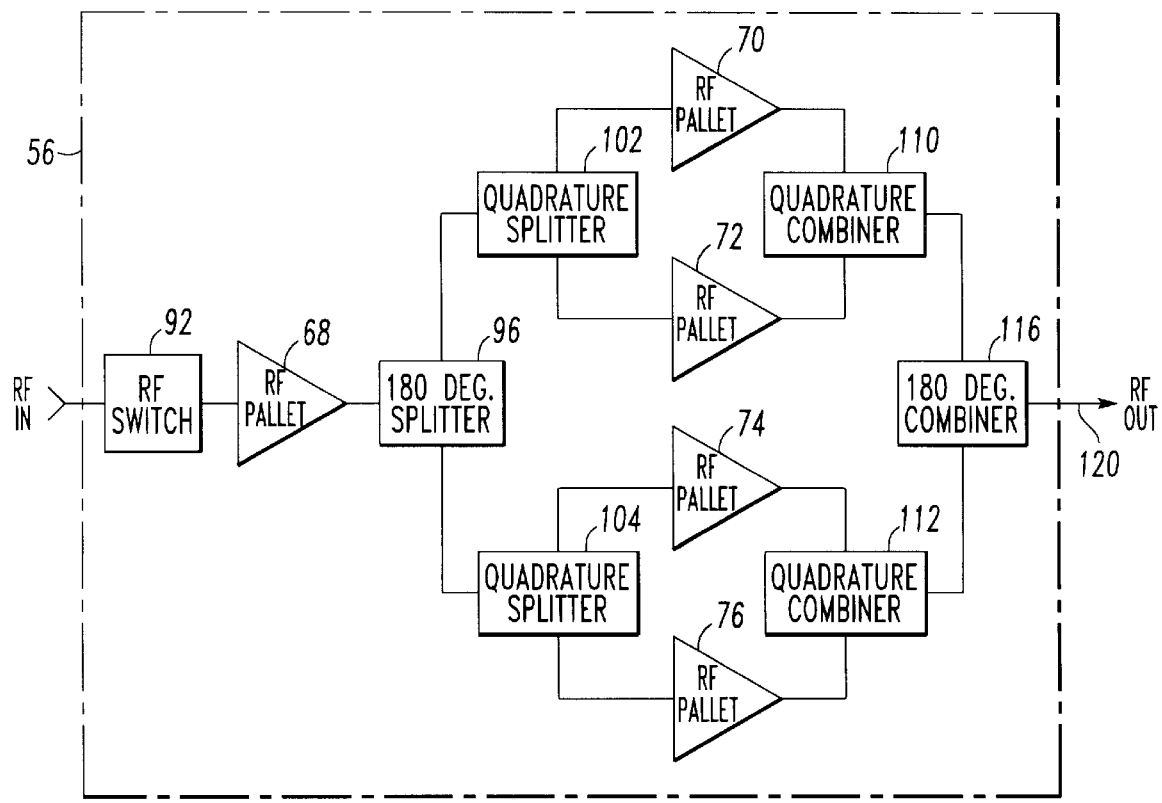

Referring now to FIG. 3, shown thereat is a block diagram which is illustrative of one of the panels D1, D2, A1, A2, . . . A12. It is to be noted that in each instance, RF power is again split and recombined, using quadraphase combining techniques. Although not shown previously, the driver pallets 58 and 68 are proceeded by respective RF switches 90 and 92. The output of the drivers 58 and 68 are also now fed to respective 180° power splitters 94 and 96, with the power splitter 94 being connected to a first pair of quadrature power splitters 98 and 100. The other 180° power splitter 96 is likewise fed to a second pair of quadrature power splitters 102 and 104. Pairs of outputs from the RF amplifier pallets 60, 62 . . . 74, 76 are fed to respective quadrature combiners 106, 108, 110 and 112 and then to 180° combiners 114 and 116. Combiner 114 provides a first of two high power RF outputs on circuit lead 118, while the second 180° combiner 116 receives the outputs of quadrature combiners 110 and 112 to provide a second high power RF output on circuit lead 120.

With an arrangement such as shown, the overall output of any RF panel A1 . . . A12 can be in the order of 400 watts of average power. Again, quadraphase combining minimizes third order intermodulation sum products and sensitivity to VSWR variations.

Figure 4:
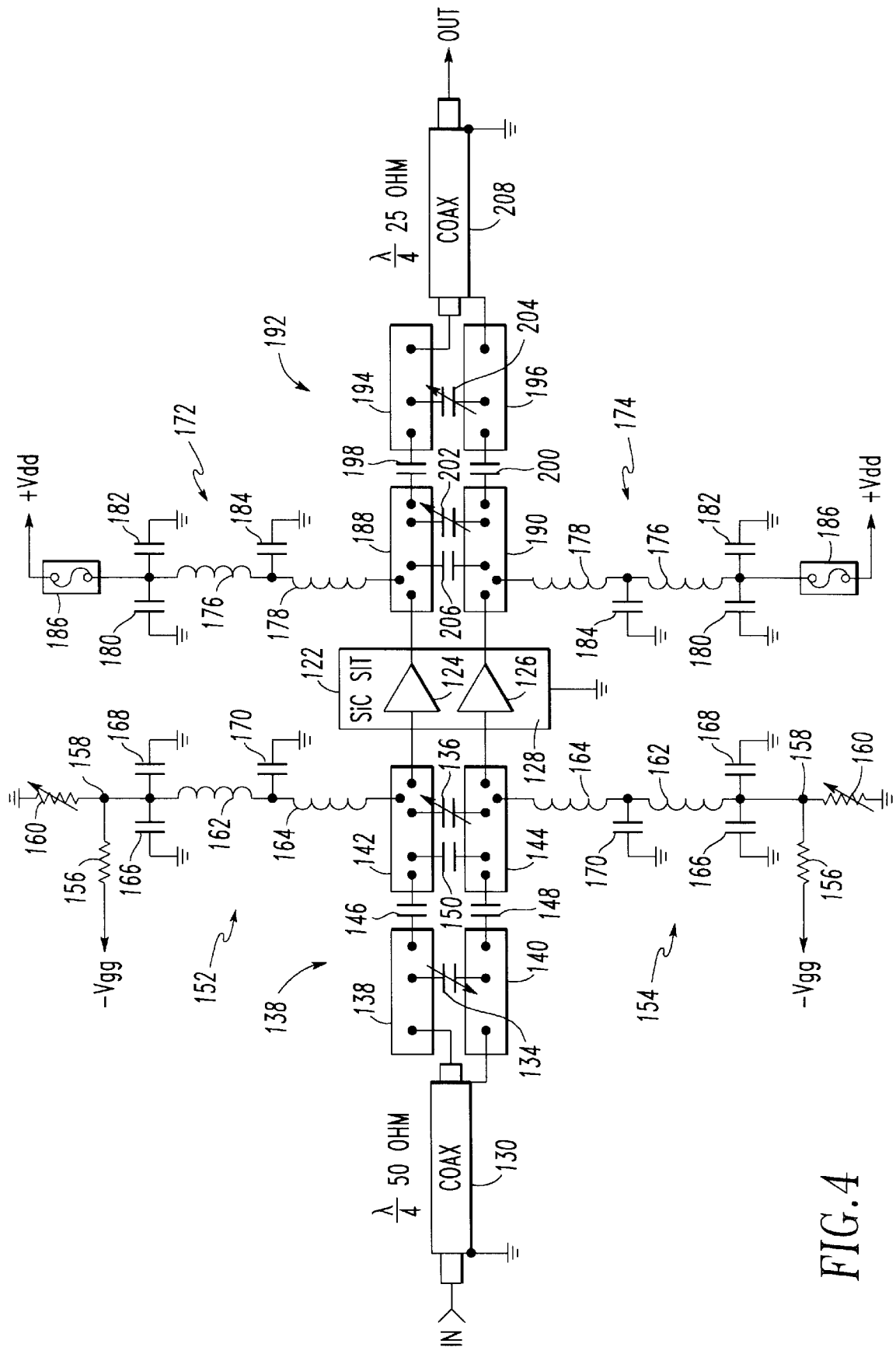
FIG. 4 is an electrical schematic diagram illustrative of one of the RF pallets included in each panel shown in FIG. 3.

Referring now to FIG. 4, each RF pallet 58, . . . 76 shown in FIG. 3 contains a UHF silicon carbide static induction transistor (SIT) package 122 consisting of two silicon carbide transistors 124 and 126, shown schematically by reference numerals, mounted on a common substrate and cooling flange 128 and are operated in push-pull relationship so as to suppress even order distortion products and reduce sensitivity to ground currents. The silicon carbide transistors 124 and 126 typically comprise a semiconductor structure known as a "Gemini package" manufactured by the Kyocera Corp. Each of the transistors 124 and 126 is comprised of 12 cells, not shown, and can typically deliver 55 watts of average output power when the signal applied thereto is 8 VSB modulated.

The transistors 124 and 126 are biased for class AB operation when operated with a drain voltage +Vdd of 60 volts. The spectral regrowth has been found to be better than −28 dBc under such bias conditions. It is to be noted that 55 watts of average output power with −28 dBc of spectral regrowth cannot be achieved with a single silicon transistor. The linearity and output power of the silicon carbide transistor utilized herein meets these parameters with potential for even better results. Adding additional cells to each transistor would increase the output power of the respective transistors 124 and 126 and the spectral regrowth should scale accordingly.

As further shown in FIG. 4, the input signal is applied to the pair of push-pull transistors 124 and 126 by way of a quarter wavelength ($\lambda/4$) piece of 50 ohm coaxial cable 130 and an input impedance matching network 132 comprised of, among other things, a pair of variable capacitors 134 and 136 mounted on respective pairs of microwave stripline conductor elements 138, 140 and 142, 144. Fixed capacitors 146 and 148 are connected between stripline elements 138 and 142 and 140 and 144, respectively. A third fixed capacitor 150 is coupled in parallel with the variable capacitor 136 across stripline elements 142 and 144.

The silicon carbide transistors 124 and 126 receive a gate bias voltage −Vgg which is applied by two separate gate bias networks 152 and 154. Both bias networks 152 and 154 are of identical construction and include a fixed resistor 156 coupled between a source of −Vgg, not shown, and a voltage divider node 158 to which is connected a variable resistor 160 returned to ground. A bias voltage appearing at circuit node 158 is coupled to the respective transistors 124 and 126 via LC filter circuitry including a pair of series connected inductors 162 and 164, and three fixed capacitors 166, 168 and 170 connected to ground.

On the other side of the silicon carbide transistors 124 and 128 are two identical drain bias networks 172 and 174 which connect to a source of drain bias voltage +Vdd, also not shown. Both networks 172 and 174 are similar to the gate bias networks 152 and 154 in that they include filter circuits consisting of a pair of series connected inductors 176 and 178 and three grounded fixed capacitors 180, 182 and 184. Now, however, the drain bias networks 172 and 174 will also include fuse devices 186. Further as shown, the +Vdd voltage is applied to the transistors 124 and 126 through respective stripline conductor members 188 and 190 forming a portion of an output impedance matching network 192. The network 192 is identical to the input impedance matching network 132 in that it includes in addition to the stripline members 188 and 190, a second pair of stripline members 194 and 196 which are coupled together by a pair of fixed capacitors 198 and 200. As before, a pair of variable capacitors 202 and 204 are connected across pairs of stripline elements 188, 190 and 194, 196. A fixed capacitor 206 is also connected between stripline elements 188 and 190 in parallel with the variable capacitor 202.

Finally, the RF output signal from the two silicon carbide transistors 124 and 126 is coupled from the output impedance matching network 192 by means of a quarter wavelength ($\lambda/4$) piece of 25 ohm coaxial cable 208 and is fed, for example, to one of the quadrature combiners 106, 108, 110 and 112 shown in FIG. 3.

Figure 5A:
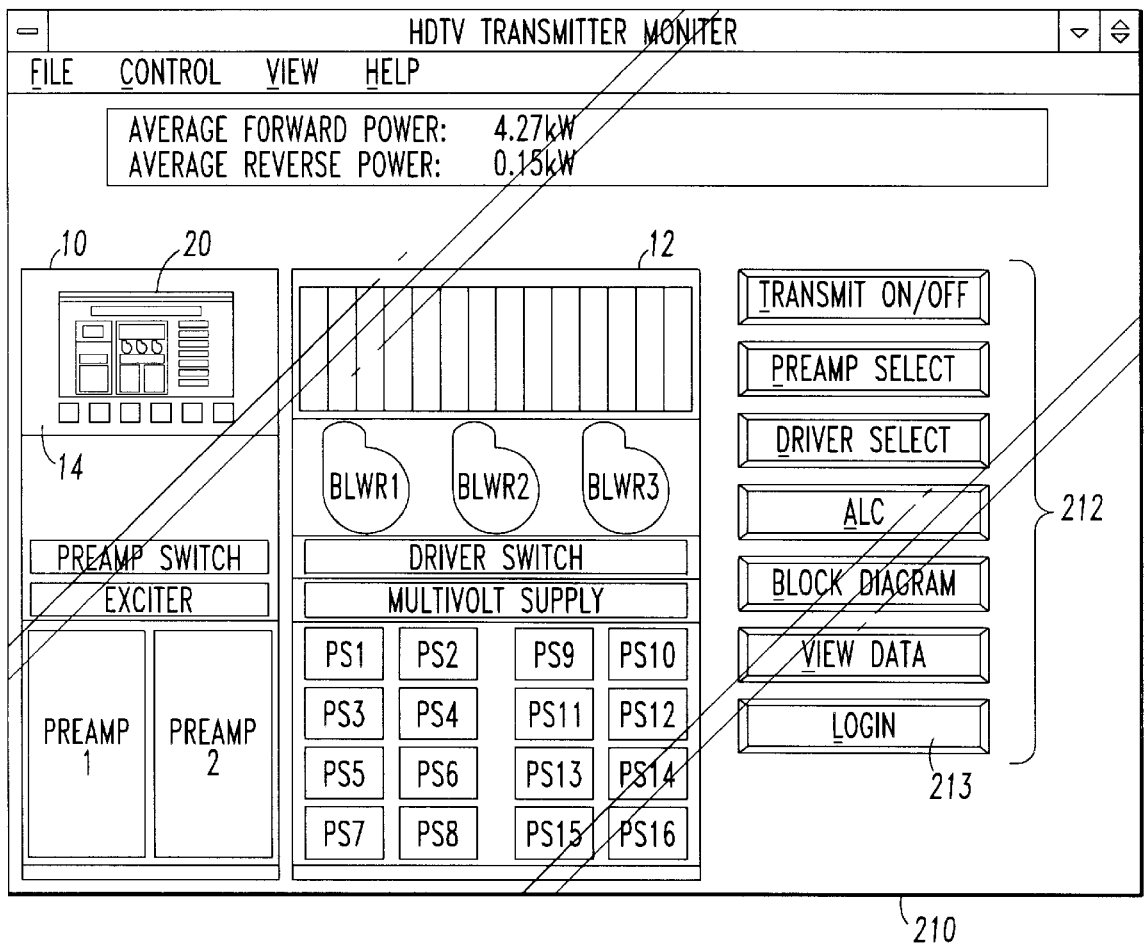
Figure 5B:
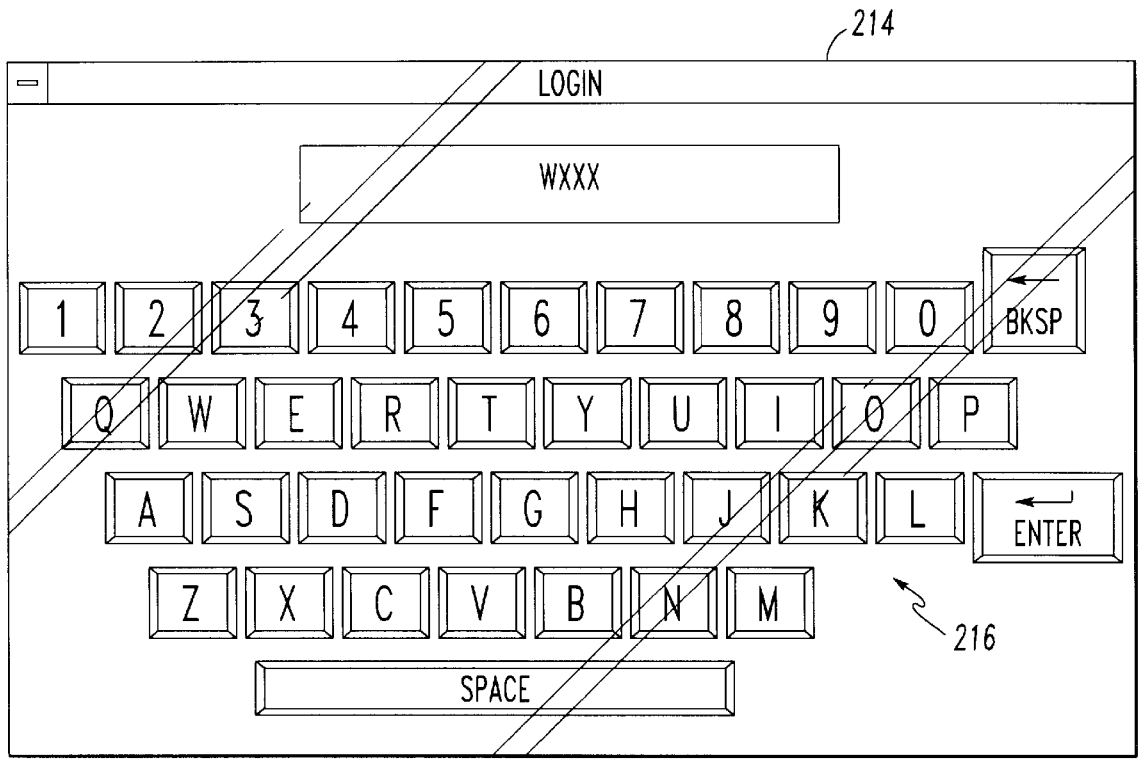

In order to allow a station engineer to maintain and service the digital television transmitter in accordance with this invention, the transmitter includes a system which monitors the status of all the silicon carbide transistors and assemblies in the transmitter as will now be shown. As noted above, the control cabinet 10 shown in FIG. 1 includes a touch screen interface including a control monitor 20 which permits the operator to control the transmitter and inquire about its operating status. Referring now to FIGS. 5A–5K, shown thereat are some of the displays which can be generated on the monitor 20. The display 210 depicted in FIG. 5A appears on the screen of the monitor 20 when the transmitter is initially turned on via the power switch 28. It essentially portrays a front planar view of both cabinets 10 and 12 and the respective apparatus located therein. The display 210, however, additionally depicts a set of generally rectangular operator control push-buttons 212 which can be touched by an operator. As shown in FIG. 5A, a "log in" element 213 supplies the operator with a lighted prompt which when touched, causes a display 214, as shown in FIG. 5B, to be generated. This display 214 resembles a typewriter keyboard 216 so that "log in" can be accomplished by touching selected keys on the screen of the monitor 20.

Figure 5F:
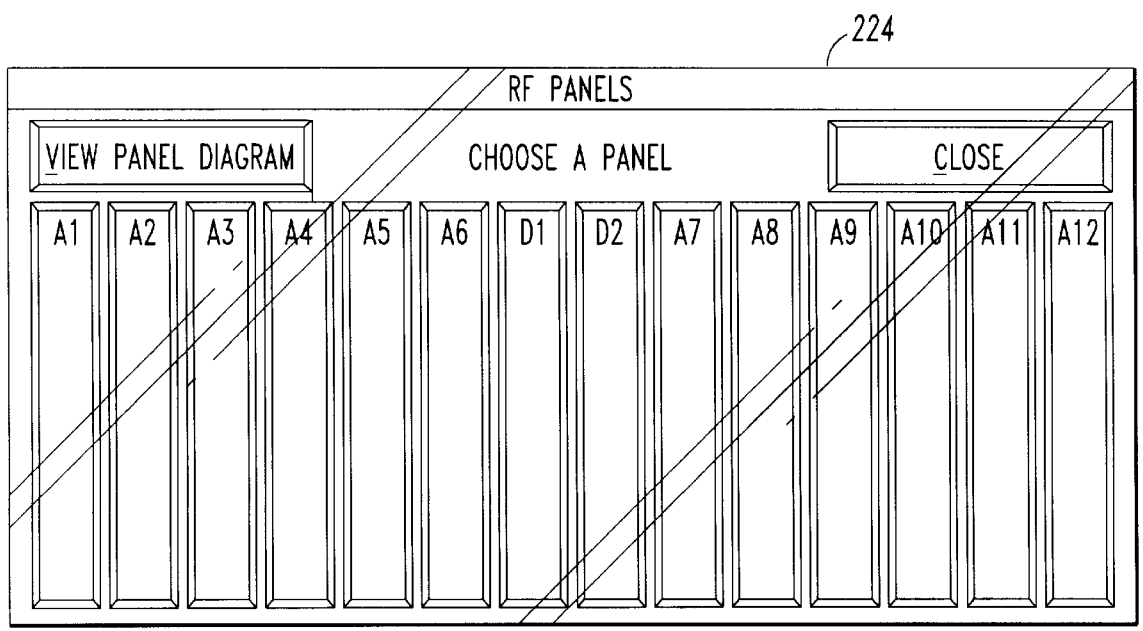
Figure 5C:
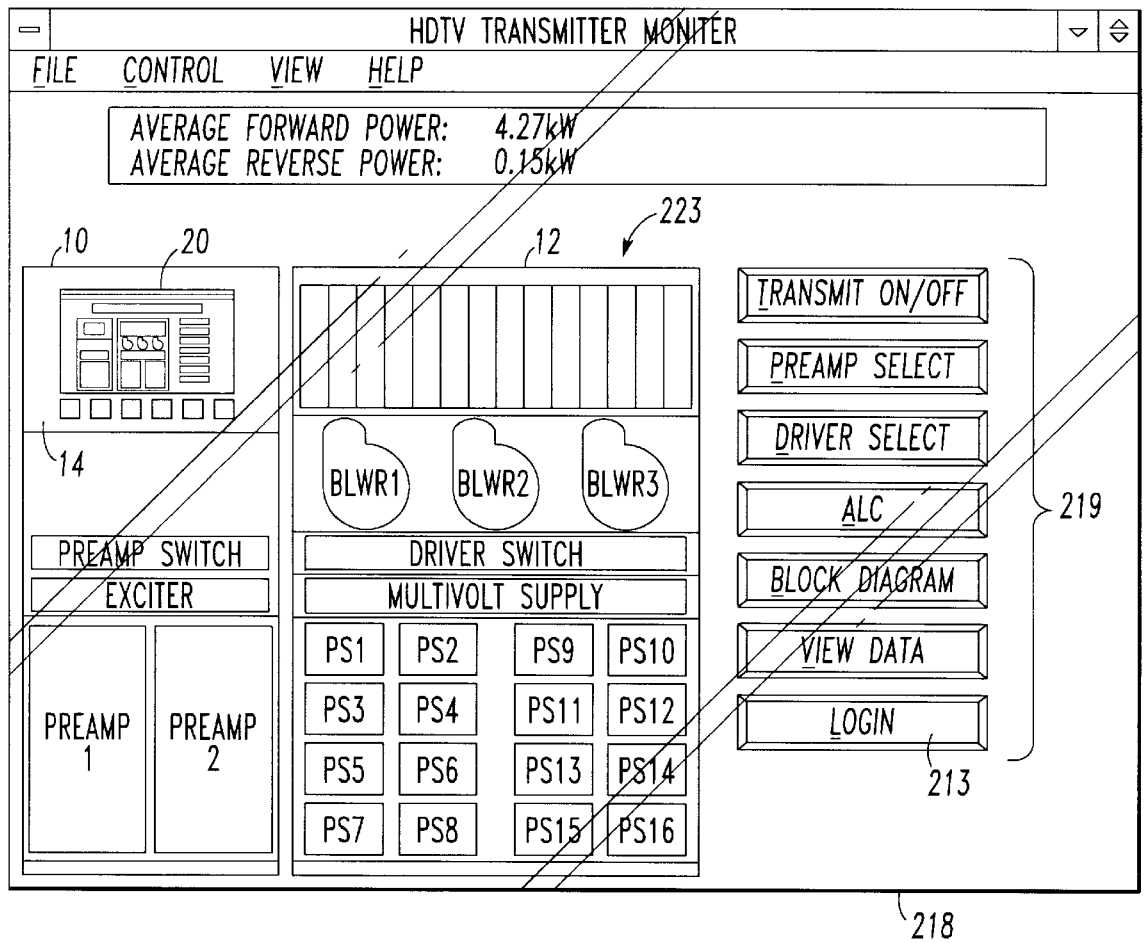
Figure 5D:
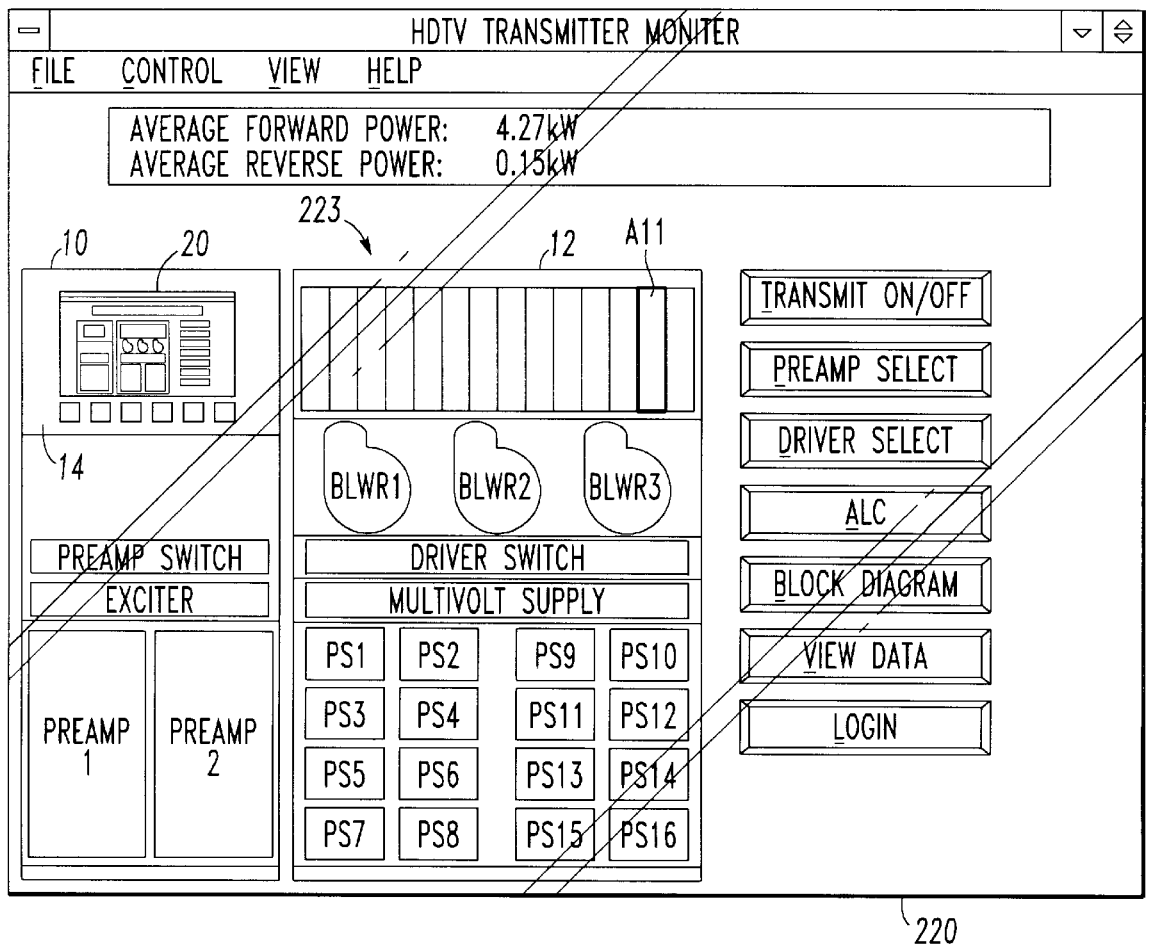
Figure 5E:
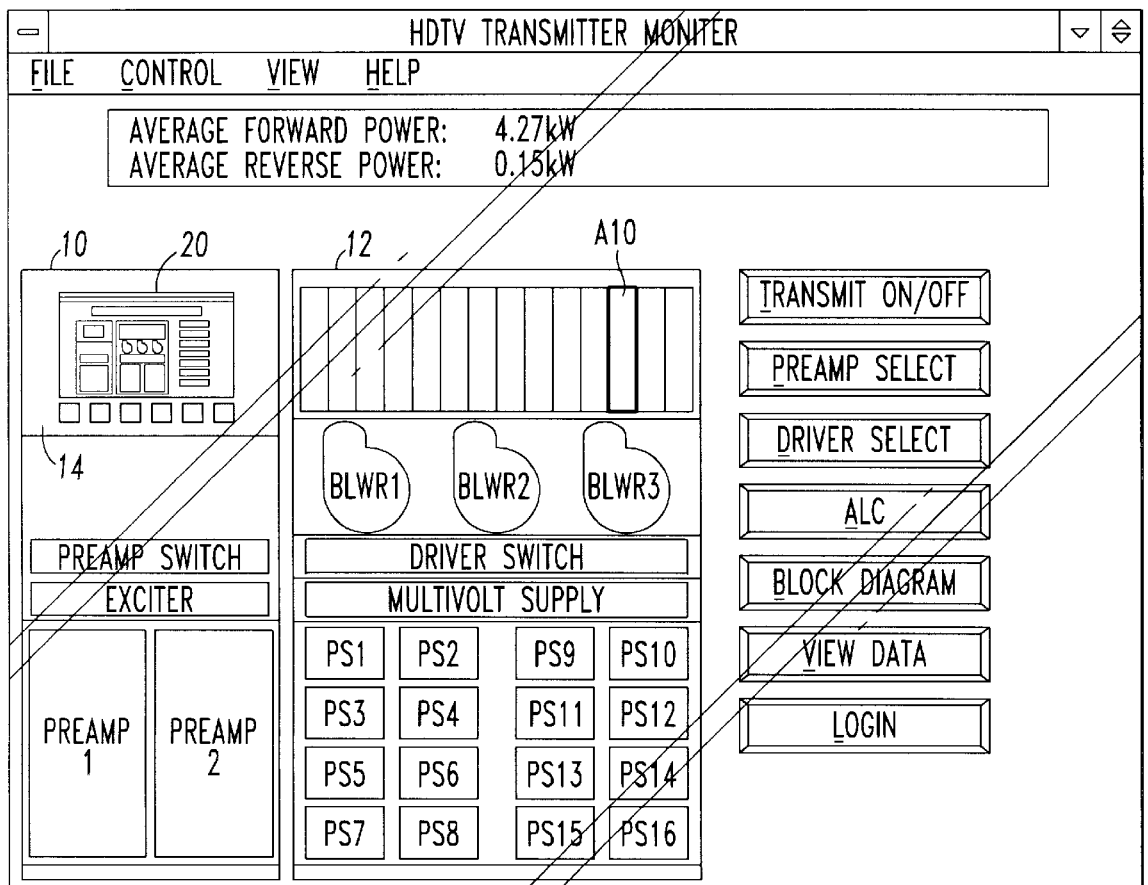

Once "log in" has taken place, one of three possible displays, 218, 220 and 222, appears as shown in FIGS. 5C–5E. Display 218 indicates that all parts of the transmitter are functioning satisfactorily and further providing six operator selection prompts 219, such as "transmit on/off", "preamp select", "driver select", etc.

If display 220 (FIG. 5D) appears, it would indicate that RF output panel A11 is operating less than satisfactorily and provides a cautionary indication. If, however, display 222 is generated as shown in FIG. 5E, it indicates, for example, that panel A10 is defective, needing replacement.

Figure 5G:
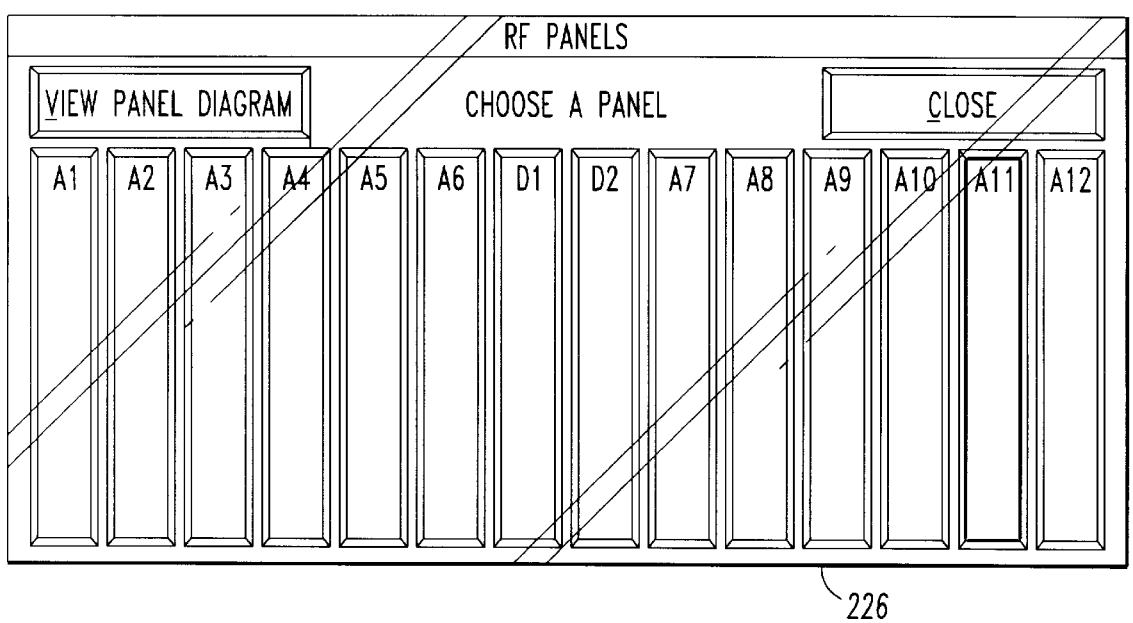
Figure 5H:
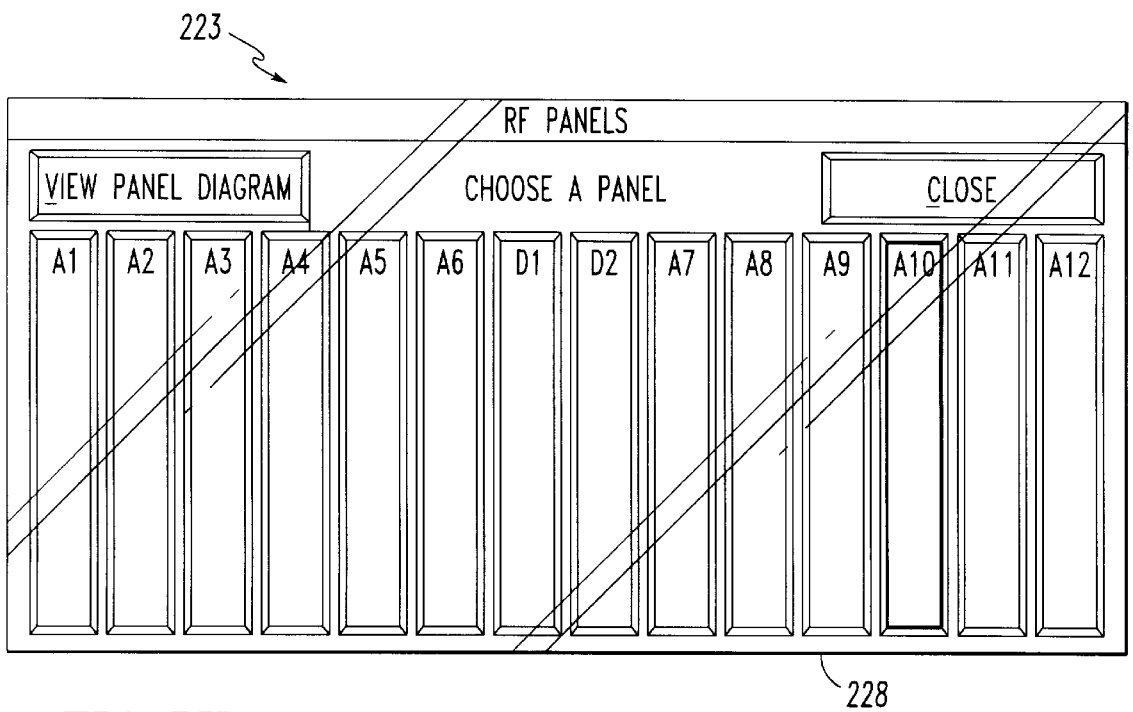

Furthermore, by touching one of the designated panel areas 223 of displays 218, 220 and 222 as shown in FIGS. 5C–5E, respective corresponding panel displays 224, 226 and 228 as shown in FIGS. 5F–5H, will appear on the screen of the monitor 20. Display 224, for example, represents the condition indicated in FIG. 5C, where all units are properly operating, display 226 corresponds to the condition where a caution condition exists for panel A11 and which corresponds to display 220 shown in FIG. 5D, and display 228 corresponds to the defective panel A10, previously represented in FIG. 5E.

Figure 5I:
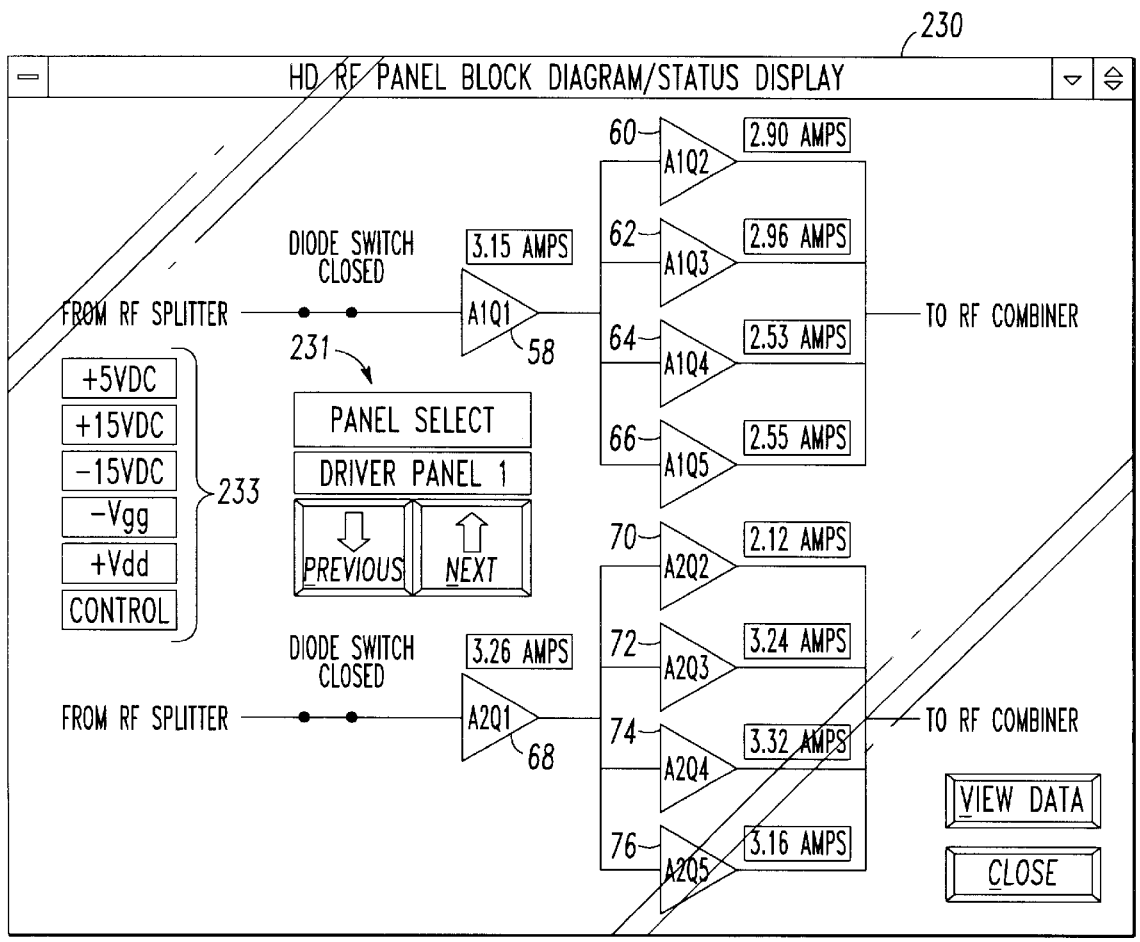
Figure 5J:
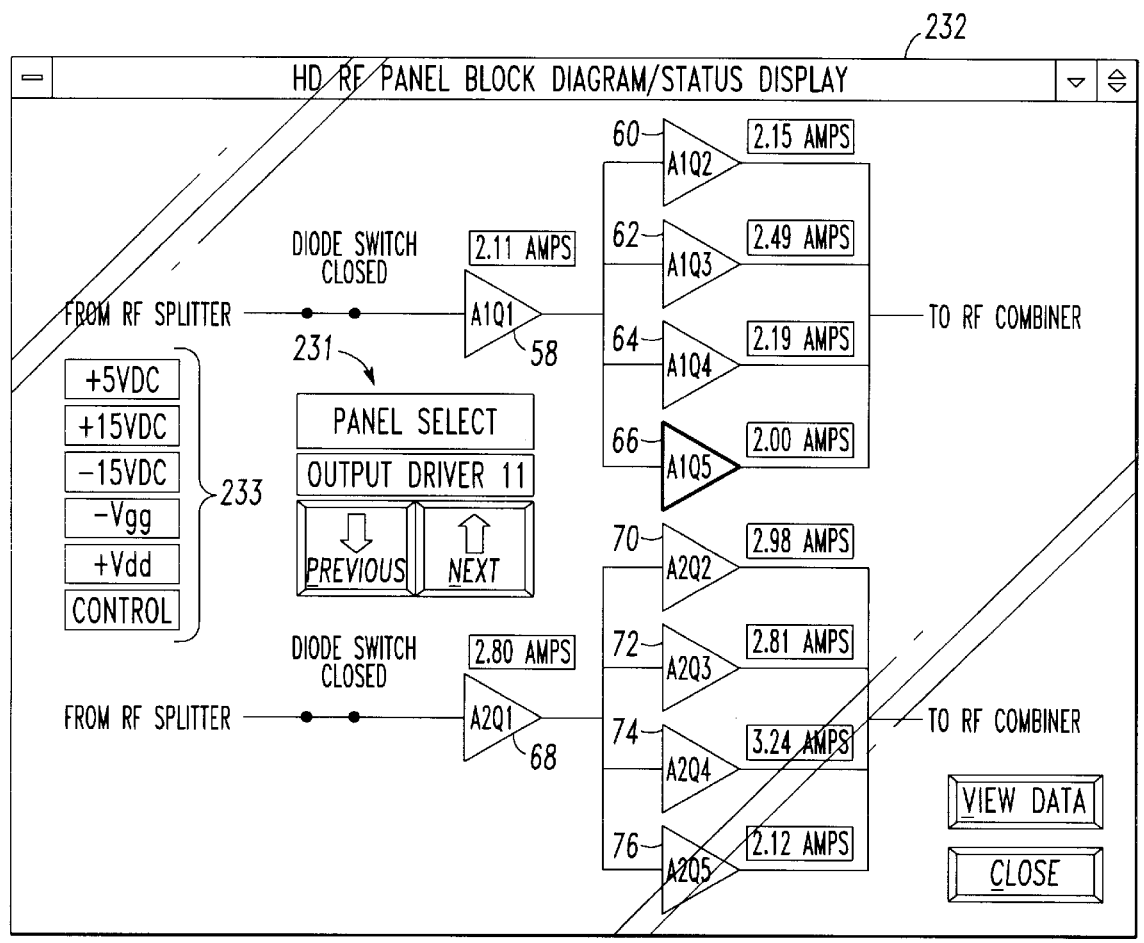

FIGS. 5I and 5J depict respective displays 230 and 232 where, for example, the driver panel D1 was touched or an output panel A11 was touched. As shown in FIG. 5I, the ten transistor pallets 58, 60 . . . 74, 76 are depicted on the screen with an indication of their respective operability and current presently being drawn thereby. The display, moreover, provides for additional panel selection at 231 as well as providing an indication of the power supply voltages being supplied at 233. The display 230 as shown in FIG. 5I is indicative of acceptable operation. On the other hand, display 232 as shown in FIG. 5J indicates that output amplifier panel A11 has a defective pallet 66 (FIG. 3).

Another type of display is shown by reference numeral 234 in FIG. 5K. What is depicted there is an indication of the respective currents being drawn by all of the ten pallets 58

... 66 and 68 ... 76 (FIG. 3) included in both the driver panels D1, D2 and the 12 output amplifier panels A1–A12 shown in FIG. 2.

Thus what has been shown and described is a silicon carbide based UHF digital television transmitter having the following unique features: (1) the transmitter is less than one half the size of its silicon transistor or tube counterpart; (2) the transmitter's output power amplifiers introduce a minimum amount of distortion to the 8 VSB digital television signal irrespective of the RF output power level; and (3) the transmitter's cooling, power supplies and monitoring systems are completely self-contained and on-line maintainable by a single operator.

Having thus shown and described what is at present considered to be the preferred embodiment of the invention, it should be noted that the same has been made by way of illustration and not limitation. Accordingly, all modifications, alterations and changes coming within the spirit and scope of the invention are herein meant to be included.

We claim:

1. A UHF television broadcast transmitter, for transmitting a digital television signal comprising:
   a power splitter coupled to a television signal to be transmitted;
   at least two driver panels selectively coupled one at a time to the power splitter and including a pair of identical silicon carbide transistor amplifier modules, said modules being coupled to the power splitter in quadrature phase relationship;
   at least two sets of parallel power amplifier panels selectively coupled to a respective amplifier module of a selected driver panel, each of said power amplifier panels also including a pair of identical silicon carbide transistor amplifier modules connected together in parallel; and
   means for combining the respective outputs of said two sets of power amplifier panels in quadrature phase relationship for providing an amplified in phase composite output signal of said television signal.

2. A television broadcast transmitter according to claim 1 and additionally including switch means located on both an input side and an output side of said at least two driver panels for selectively coupling said television signal from said power splitter through only one of said driver panels to said power amplifier panels at any one time.

3. A television broadcast transmitter according to claim 2 wherein said amplifier modules of said power amplifier panels and said amplifier modules of said driver panels comprise like modules.

4. A television broadcast transmitter according to claim 3 wherein each of said modules is comprised of at least one other power splitter coupling a portion of said television signal to a pair of silicon carbide transistor amplifier pallets in quadrature phase relationship and at least one other power combiner coupled to said pair of silicon carbide transistor amplifier pallets in phase quadrature for combining respective outputs of said pair of pallets.

5. A television broadcast transmitter according to claim 4 wherein each of said silicon carbide transistor amplifier pallets includes two silicon carbide transistors connected together in a predetermined circuit relationship.

6. A television broadcast transmitter according to claim 5 wherein said predetermined circuit relationship of said transistors comprises a push-pull circuit relationship.

7. A television broadcast transmitter according to claim 6 wherein said two silicon carbide transistors are part of a common semiconductor package.

8. A television broadcast transmitter according to claim 7 wherein said two silicon carbide transistors are mounted on a common cooling flange.

9. A television broadcast transmitter according to claim 4 wherein each of said modules additionally includes another power splitter coupling a portion of said television signal to a second pair of silicon carbide transistor amplifier pallets in quadrature phase relationship and another power combiner coupled to said second pair of silicon carbide transistor amplifier pallets for combining respective outputs of said second pair of silicon carbide transistor amplifier pallets.

10. A television broadcast transmitter according to claim 9 wherein each of said modules additionally includes a silicon carbide transistor driver amplifier pallet coupled to said one other and said another power splitter.

11. A television broadcast transmitter according to claim 10 wherein each said modules additionally include yet another power splitter coupled between said driver amplifier pallet and said one other and said another power splitter for coupling said portion of said television signal from said driver amplifier pallet in a mutually opposite phase relationship to said power splitters and yet another power combiner coupled to said one other power combiner and said another power combiner for recombining mutually opposite phase relationship signal to an in-phase composite amplified television signal.

12. A television broadcast transmitter according to claim 11 wherein said one other power splitter and said another power splitter comprise phase quadrature signal splitters and said one other power combiner and said another power combiner comprises phase quadrature signal combiners.

13. A television broadcast transmitter according to claim 12 wherein said yet another power splitter comprises a 180° signal splitter and said yet another power combiner comprises a 180° signal combiner.

14. A television broadcast transmitter according to claim 11 wherein each of said modules includes an RF switch located between one module of said driver panel and said driver amplifier pallet.

15. A television broadcast transmitter according to claim 11 wherein all of said silicon carbide transistor amplifier pallets include a pair of silicon carbide transistors.

16. A television broadcast transmitter according to claim 15 wherein said pair of silicon carbide transistors are connected in push-pull circuit relationship.

17. A television broadcast transmitter according to claim 1 wherein said driver panels and said power amplifier panels comprise a set of like removable panels located side by side in an equipment cabinet.

18. A television broadcast transmitter according to claim 17 wherein said equipment cabinet also houses air cooling means for said panels.

19. A television broadcast transmitter according to claim 17 wherein said equipment cabinet also houses a plurality of power supplies for said panels.

20. A television broadcast transmitter according to claim 1 and additionally including means for controlling and monitoring the operation of said driver panels and said modules thereof and said power amplifier panels and said modules thereof.

21. A television broadcast transmitter according to claim 20 wherein said means for controlling and monitoring includes means for generating a visual display.

22. A television broadcast transmitter according to claim 21 wherein said means for generating a visual display comprises a touch screen display and control panel.

* * * * *